(12) United States Patent  
Solano Cabello

(10) Patent No.: US 8,627,597 B2  
(45) Date of Patent: Jan. 14, 2014

(54) GREEN WALL SYSTEM

(76) Inventor: Ignacio Solano Cabello, Alicante (ES)

( * ) Notice: Subject to any disclaimer, the term of this patent is extended or adjusted under 35 U.S.C. 154(b) by 0 days.

(21) Appl. No.: 13/699,376

(22) PCT Filed: Jan. 10, 2011

(86) PCT No.: PCT/ES2011/070009  
§ 371 (c)(1),  
(2), (4) Date: Feb. 11, 2013

(87) PCT Pub. No.: WO2011/148011  
PCT Pub. Date: Dec. 1, 2011

(65) Prior Publication Data  
US 2013/0133260 A1 May 30, 2013

(30) Foreign Application Priority Data  
May 26, 2010 (ES) ..................... 201030799

(51) Int. Cl.  
*A01G 31/00* (2006.01)  
*A01G 9/02* (2006.01)  
*A01G 25/00* (2006.01)

(52) U.S. Cl.  
USPC ................................ 47/62 R; 47/65.9; 47/79

(58) Field of Classification Search  
USPC .................... 47/62 R, 62 A, 62 C, 62 N, 65.9  
See application file for complete search history.

(56) References Cited

U.S. PATENT DOCUMENTS

2007/0251145 A1  11/2007  Brusatore  
2009/0007486 A1   1/2009  Corradi

OTHER PUBLICATIONS

International Search Report for PCT/ES2011/070009 dated May 24, 2011.

*Primary Examiner* — Monica Williams  
(74) *Attorney, Agent, or Firm* — Sughrue Mion, PLLC

(57) ABSTRACT

The system is based on placing on the façade a suitably anchored metal structure to which is fixed a plastic panel supporting geomesh layers that constitute support for the plants. At the top of these geomesh layers drip irrigation nozzles are arranged, supplied by a water recirculation pipe, and excess water is collected in a channel, which is then filtered, analysed, supplemented with fertilizer and acids, all under computer control. There is also the option to empty the recirculation circuit and add new water treated by reverse osmosis from a tank.

4 Claims, 1 Drawing Sheet

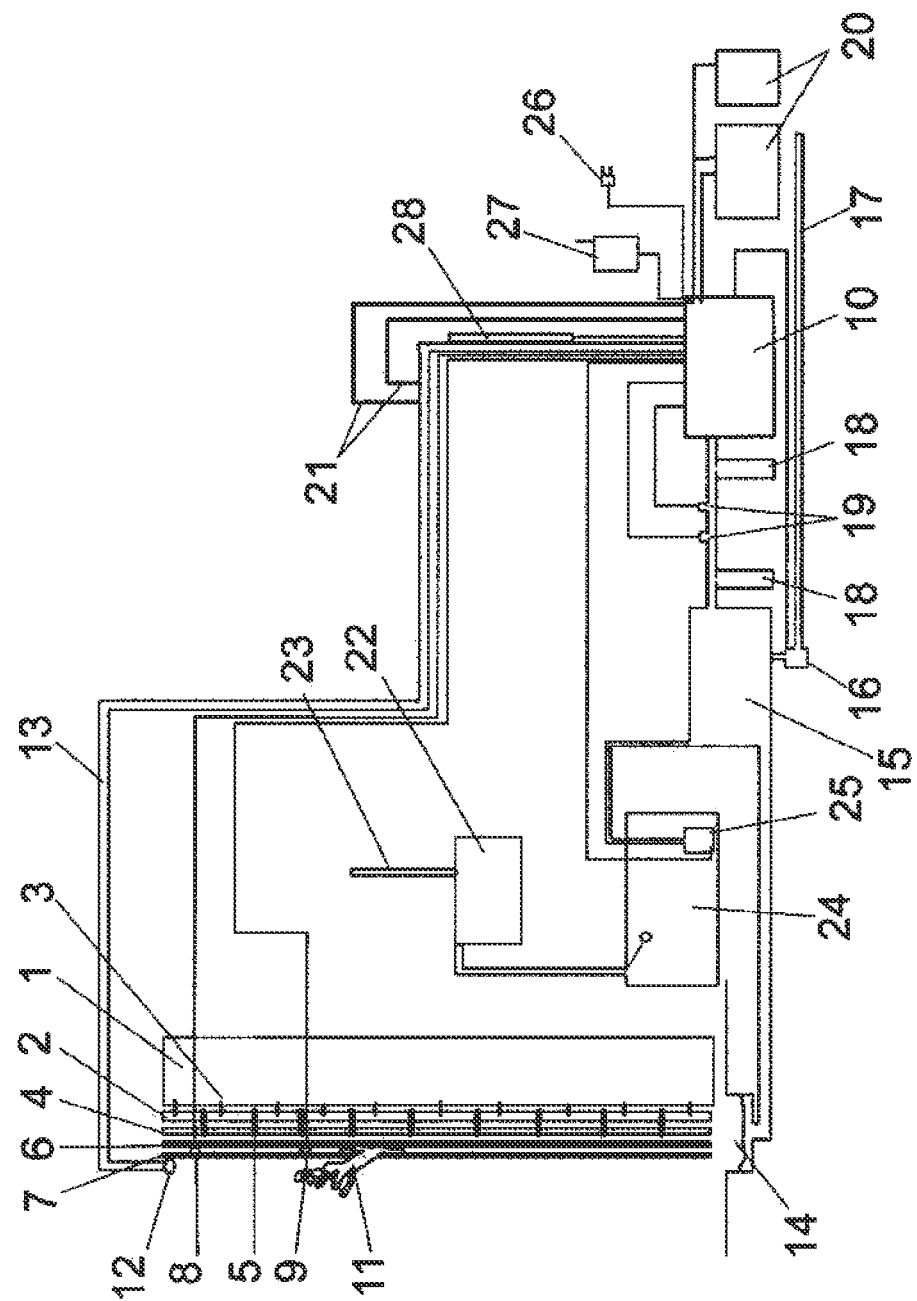

GREEN WALL SYSTEM

OBJECT OF THE INVENTION

This invention refers to a façade greening system based on a plant supporting system that is fixed on the whole surface of the façade and a water recirculation and treatment installation for watering the plants.

The aim of the invention is to make it possible to grow plants on a part or the whole surface of a façade in a simple, effective and economical way.

BACKGROUND OF THE INVENTION

With respect to façade greening, there are no known systems that enable growing of plants on the surface of a façade as such, but what is known are plant boxes on the top or a high point on the façade and hanging plants can be planted in these boxes to only cover the top part of the façade but never the whole or certain areas of it. It is also not possible to put bushes and similar plants in place to decorate a façade.

DESCRIPTION OF THE INVENTION

The façade greening system of the invention is designed to allow the proliferation of plants vertically, with minimum human interaction, watering them using hydroponic principles, recirculating and analysing the recirculated water, and at the same time correcting the chemical parameters of this water by adding chemicals and taking advantage of the whole system to carry out irrigation. The entire operation of the system is controlled by computer.

More specifically, the system of the invention is based on fixing a self-supporting and metal structure on the surface of the façade, screwed to the wall, and this self-supporting system constitutes a means of support for a plastic panel located in front of it, which additionally functions as thermal and acoustic insulation, and also constitutes a means of insulation from humidity, equally acting as a support for geomesh on which the plants are arranged in such a way that the geomesh in turn form a means of retaining the hydroponic solution.

This structure, located over the front part of the façade and with the plants located on the geomesh, receives irrigation water by dripping through a pipe that forms part of an installation in which the water is appropriately treated to be recirculated for irrigation, so that in the lower part of the façade or structure fixed to it there is a channel and irrigation water collector that can be emptied to the outside from a tank of nutrient solution, in which case the water is improved and appropriately treated by reverse osmosis and returned to the irrigation head.

Water that is recirculated is filtered and analysed under computer control so that subsequently, and by means of peristaltic pumps, fertilisers and acids can be applied by injection to the pipe that leads to the irrigation nozzles. All the water that passes through the tubing to the proposed system is filtered through a UV filter ensuring disinfection and prevention of proliferation of harmful bacteria and fungi. The system for injection of fertilisers also comprises a peristaltic pump that injects a biological insect repellent to ensure that insects do not proliferate in the system, so that the whole system is periodically self-cleaning and self-refilling without consuming irrigation water.

Treatment of water by reverse osmosis is carried out in a tank with access to the water supply network and from this tank it passes to an accumulation tank, at the bottom of which is a remote control valve to transfer the water to the water recirculation collection tank when this water has been passed towards a drain through the corresponding remote controlled valve. When this valve is in the closed position, the recirculated water passes through the filters, through the irrigation control system where the analysis of pH and conductivity are carried out using sensors that are part of the control system, it receives acid and fertiliser by injection and the water is circulated again towards the drip irrigation nozzles, which are located on the upper part of the geomesh that forms the supporting structure for the plants fixed to the façade.

DESCRIPTION OF THE FIGURES

To complement the description below and with the aim of improving understanding of the characteristics of the invention and a practical example of its embodiment, the description is accompanied by a single drawing, which is illustrative and non-limiting, that forms an integral part of it and which shows the following:

The single FIGURE shown in the sheet of drawings is a schematic view of the whole of the structure and installation forming the façade greening system of the invention.

PREFERRED EMBODIMENT OF THE INVENTION

The FIGURE referred to above, of the façade (1) greening system of the invention comprises a metal structure (2) covering the whole surface or the part desired of the façade (1), set in front of it and fixed to it by an appropriate anchoring system (3).

In turn, on this metal structure (2), a plastic panel (4) is fixed using rivets (5), so that in turn this plastic panel (3) constitutes a support for a geomesh (also known as a geogrid) structure (6 and 7), forming two layers, a first (6) that is stapled to the plastic panel (4), over the whole of the surface, while the second layer (7) is fixed to the former by stapling, this second layer constituting a perimetral surrounding to create a space in which the plants (11) are placed, with the feature that between both layers of geomesh (6 and 7) there is a humidity sensor (8) and a solar radiation sensor (9), both controlled by a computer (10). The humidity sensor (8), if it detects a lack of humidity, sends the corresponding electronic signal to be deciphered by the computer, with irrigation water being transmitted immediately along with an SMS informing the user of the incident.

The solar radiation sensor (9) sends the corresponding signal so that when the sun is strong more irrigation water is requested from the system. The irrigation is carried out by drip irrigation nozzles (12) set in the upper part of the structure formed by the geomesh layers (6 and 7), these nozzles (12) being fed through a water recirculation pipe (13), as explained below.

In relation to the geomesh (6 and 7) structure, it not only constitutes a means of support for the plants (11) but also constitutes a means of retention of the hydroponic irrigation solution.

Excess water from irrigation is collected in a channel (14) located at the bottom and stored in a tank (15), in the bottom of which is a remote control valve (16) under remote control for possible emptying of the system towards a drain or cleaning exit (17).

From the collection tank (15), the water is passed through filters (18) and in turn flows past pH and conductivity sensors (19), logically controlled by the computer (10), so that this filtered and analysed water is supplemented with fertilisers and acids contained in tanks (20), these being injected into the circulation pipe (13) by injectors (21), and the water reaching the irrigation nozzles (12).

Consequently, excess water from irrigation that is collected in the tank (15) is filtered to remove solid impurities and then analysed by control equipment constituted by sensors (19). Then, by means of peristaltic pumps controlled by the computer (10), the chemical fertilizer and acid products contained in tanks (20), which are necessary to improve the irrigation solution, are added.

Computer (10) executes the programmed work, all monitored by SMS/GSM control that sends text messages to the mobile telephone of the maintenance staff, informing them of pressure failure in the system, lack of water, lack of fertilisers or acid, failure of electricity supply, failure of humidity in the plantation substrate or any other anomaly that might occur in the system.

Water, which is constantly reused, can be exchanged for clean water obtained from a tank (22) in which there is a reverse osmosis system. This tank (22) is supplied through a mains water connection (23), with clean water being collected in a tank (24), in the bottom of which is a remote controlled submerged pump (25) that transfers clean and treated water to the tank (15), after the whole circulation circuit is emptied using the remote control valve (16) located at the bottom of this tank (15).

As can be seen, both the pumps (25) and the remote control valve (16) and of course all the other functional components of the recirculation system are controlled by the computer (10), with a mains electricity connection (26) that supplies the various components including the computer (10) itself, as well as the GSM warning module (27).

Lastly, the irrigation water recirculation pipe (13) has a UV filter (28) that ensures disinfection and prevents proliferation of harmful bacteria or fungi.

The system assembled in this way enables the proliferation of plants vertically on a façade, with minimum human interaction, watering them by the hydroponic principle and recirculating the water, which is analysed to correct its chemical parameters, and all controlled by computer.

The invention claimed is:

1. A facade greening system that enables proliferation of plants vertically on a facade, comprising a metal supporting structure anchored to the facade, on said metal supporting structure is fixed a plastic panel, on said plastic panel are fixed two layers of geomesh, between which are located the plants; at the top of the geomesh layers drip irrigation nozzles are arranged, connected to a water recirculation pipe, and configured so that excess water is collected in a channel, from said channel the excess water is sent to a collection tank, from said collection tank the water is passed through filters and by pH and conductivity sensors for analysis, all under control of a computer, said computer sends signals to peristaltic pumps for injection, through injectors, of fertilisers and acids contained in tanks, the injectors configured to make the injection into the water recirculation pipe, in which there is a UV filter to prevent the proliferation of bacteria, algae and fungi and to ensure disinfection of the whole system.

2. The facade greening system of claim 1, characterised in that a reverse osmosis water treatment system is included, comprising a tank that is supplied with water from a supply water connection so that the water treated by osmosis in the tank is transferred to a holding tank in which there is a submerged pump in the bottom, that sends the water to the collection tank, after the whole irrigation circuit is emptied by a pump to a drain or exit duct.

3. The facade greening system of the previous claim 2, characterised in that on the geomesh layers there are humidity sensors and solar radiation sensors to detect loss of humidity and solar heat, said humidity sensors and solar radiation sensors sending the corresponding signals to the computer, so that on receiving these signals, water is supplied to the irrigation nozzles.

4. The facade greening system of claim 1, characterised in that on the geomesh layers there are humidity sensors and solar radiation sensors to detect loss of humidity and solar heat, said humidity sensors and solar radiation sensors sending the corresponding signals to the computer, so that on receiving these signals, water is supplied to the irrigation nozzles.

* * * * *